(12) United States Patent
Rojo Saiz et al.

(10) Patent No.: US 12,378,943 B2
(45) Date of Patent: Aug. 5, 2025

(54) WIND TURBINE BLADE (71) Applicant: Siemens Gamesa Renewable Energy Innovation & Technology S.L., Sarriguren (ES)

(72) Inventors: Nicolas Rojo Saiz, Navarra (ES); Javier Yuste Soler, Navarra (ES)

(73) Assignee: Siemens Gamesa Renewable Energy Innovation & Technology S.L., Sarriguren (ES)

(*) Notice: Subject to any disclaimer, the term of this patent is extended or adjusted under 35 U.S.C. 154(b) by 59 days.

(21) Appl. No.: 17/641,194

(22) PCT Filed: Sep. 11, 2020

(86) PCT No.: PCT/EP2020/075514
§ 371 (c)(1),
(2) Date: Mar. 8, 2022

(87) PCT Pub. No.: WO2021/048383
PCT Pub. Date: Mar. 18, 2021

(65) Prior Publication Data
US 2022/0341388 A1    Oct. 27, 2022

(30) Foreign Application Priority Data

Sep. 13, 2019  (EP) .................................... 19380022
Nov. 15, 2019  (EP) .................................... 19380029

(51) Int. Cl.
*F03D 1/06* (2006.01)

(52) U.S. Cl.
CPC ...... *F03D 1/0633* (2013.01); *F05B 2240/301* (2013.01); *F05B 2250/291* (2013.01); *F05B 2280/6003* (2013.01); *F05B 2280/702* (2013.01)

(58) Field of Classification Search
CPC ................. F03D 1/0633; F03D 1/0675; F05B 2240/301; F05B 2280/6003; F05B 2280/702; B29D 99/0028
See application file for complete search history.

(56) References Cited

U.S. PATENT DOCUMENTS

2005/0186081 A1    8/2005  Mohamed
2009/0169392 A1    7/2009  Kuroiwa et al.
(Continued)

FOREIGN PATENT DOCUMENTS

CN    101021202 A       8/2007
CN    103003060 A   *   3/2013  ........... B29C 70/865
(Continued)

OTHER PUBLICATIONS

International Search Report & Written Opinion for PCT/EP2020/075514 issued Dec. 23, 2020.
(Continued)

*Primary Examiner* — Woody A Lee, Jr.
*Assistant Examiner* — Jesse M Prager
(74) *Attorney, Agent, or Firm* — Schmeiser, Olsen & Watts, LLP (57) ABSTRACT

Provided is a wind turbine blade, with a generally hollow blade body including half shells and webs, with each web including flanges with the first and second webs being supported via respective reinforcement structures relative to the respective half shell, which reinforcement structures are arranged between an outer and an inner layer of the upper and lower half shell of the shells and extend in the lengthwise direction of the blade, wherein the first and second reinforcement structures each include at least one stack composed of several pultruded composite strips including carbon fibers with the strips being fixed in the resin, wherein at least one stiffening element extending parallel to the (Continued)

reinforcement structures over at least a part of their length comprising at least one stack composed of several glass fiber layers infused with resin is arranged between the reinforcement structures.

14 Claims, 4 Drawing Sheets

(56)  References Cited

U.S. PATENT DOCUMENTS

| | | | |
|---|---|---|---|
| 2014/0271217 A1* | 9/2014 | Baker | F03D 1/0633 |
| | | | 416/226 |
| 2014/0301859 A1 | 10/2014 | Hancock et al. | |
| 2017/0218918 A1* | 8/2017 | Cieslak | B32B 5/12 |
| 2018/0223798 A1* | 8/2018 | Caruso | B29D 99/0025 |

FOREIGN PATENT DOCUMENTS

| | | |
|---|---|---|
| CN | 104114856 A | 10/2014 |
| DE | 10 2007 007092 A1 | 8/2007 |
| EP | 2 791 500 B1 | 3/2019 |
| GB | 2 530 072 A | 3/2016 |
| WO | WO-2016189051 A1 * 12/2016 | ........... F03D 1/0633 |

OTHER PUBLICATIONS

Rosemeier Met Al: "A concept study of a carbon spar cap design for a 80m wind turbine blade", Journal of Physics: Conference Series, Institute of Physics Publishing, Bristol, GB, vol. 524, No. 1, Jun. 16, 2014.

* cited by examiner

WIND TURBINE BLADE

CROSS-REFERENCE TO RELATED APPLICATIONS

This application claims priority to PCT Application No. PCT/EP2020/075514, having a filing date of Sep. 11, 2020, which claims priority to EP Application No. 19380029.9, having a filing date of Nov. 15, 2019, and EP Application No. 19380022.4, having a filing date of Sep. 13, 2019, the entire contents all of which are hereby incorporated by reference.

FIELD OF TECHNOLOGY

The following relates to a wind turbine blade, with a generally hollow blade body comprising an upper and a lower half shell and first and second elongated webs each extending in the lengthwise direction of the blade and being disposed between the and connected to the upper and the lower half shell, with each web comprising an upper and a lower flange connecting the respective web to the respective half shell, and with the first and second webs being supported via respective first and second reinforcement structures relative to the respective half shell, which reinforcement structures are arranged between an outer and an inner layer of the upper and lower half shell and extend in the lengthwise direction of the blade, wherein the first and second reinforcement structures each comprise at least one stack composed of several pultruded composite strips comprising carbon fibers with the strips being fixed in the resin.

BACKGROUND

As commonly known, wind turbine blades are parts of a wind turbine which is used for generating electric power. A wind turbine usually comprises three blades attached to a hub, which is connected to a generator arranged in a nacelle. The blades interact with the passing wind resulting in a rotation of the hub finally driving the generator.

A turbine blade usually comprises a hollow blade body with an upper and a lower half shell, which are usually separately produced and fixed to each other. Within this hollow blade body first and second elongated webs are arranged, which connect both half shells and support them while also transferring the loads acting on the respective shells due to aerodynamic reasons and the circular movement of the blade when rotating. The load comprises pressure and suction loads on the upper and lower half shell and compressive and tensile loads. A wind turbine blade with this common setup is for example disclosed in EP 2 791 500 B1.

For supporting the half shells and for transferring the respective loads each elongated web extends in the lengthwise direction and is connected to the respective half shell via a flange provided at the respective web side, which flange is attached to an inner layer of the upper and lower half shell by an adhesive. For transferring the loads respectively supporting the respective shells each web is supported via respective first and second reinforcement structures relative to the respective half shell. Such a reinforcement structure is commonly also named as a spar cap. Like the respective webs and their flanges, also these reinforcement structures or spar caps extend in a lengthwise direction of the blade. These reinforcement structures, as for example also enclosed in EP 2 791 500 B1, are made of stacks comprising separate carbon fiber pultrusion strips, which are arranged above each other and fixed in a resin matrix. During the manufacturing of such a pultruded strip, the carbon fibers are pulled through a supply of liquid resin, which resin is then heated and cured finally forming the respective pultruded strip. These pultruded carbon fiber strips show excellent mechanical properties in taking the respective loads and distributing them and also absorb high bending moments which arise during the blade rotation.

In a known wind turbine blade design as for example disclosed in EP 2 791 500 B1 the blade comprises a first and a second web, which extend almost entirely over the length of the blades and which are arranged in the central body area, i.e., in the area, where the upper and lower half shell, seen in the drop-like cross section, have a large distance. It is also possible to provide a third web, which web is arranged close to the trailing edge of the blade. This third web extends only along a part of the trailing edge, which in this part often has a specific edge design and is subjected to specific loads, which are taken respectively distributed by this web.

All webs comprise an elongated web body with the flanges arranged at the ends of the web body. Each web is supported by two reinforcement structures, i.e., spar caps, so that in total six spar caps are arranged in both shells for supporting the three webs. If only the first and the second web is provided, four spar caps need to be integrated, if three webs are provided six spar caps need to be integrated. The spar caps made of the carbon strips are pre-fabricated and are arranged in the shell mould for their integration. As two or three webs and four or six spar caps need to be integrated, the total mass of such a known turbine blade is high, although the mass of the spar caps itself is somehow reduced due to the use of carbon fiber pultrusion stacks, which on the other hand need to be fabricated external to the shell and are expensive.

SUMMARY

An aspect relates to an improved wind turbine blade design allowing a proper load support and having a less complex and expensive design.

For addressing this problem, a wind turbine blade as mentioned above is characterised in that at least one stiffening element extending along the first and second reinforcement structures over at least a part of their length comprising at least one stack composed of several glass fiber layers infused with resin is arranged between the first and second reinforcement structures.

The inventive wind turbine is characterised by a specific layout or design of the support structure integrated in the upper and lower half shell for supporting the first and second web, which are arranged in the part of the hollow body where both shells are remarkably distanced to each other. As in the conventional art, both webs are supported by separate first and second reinforcement structures integrated between the outer and inner layer of the shell. Like at known blade designs, these reinforcement structures are made of several pultruded composite strips comprising carbon fibers with the strips being embedded in the resin.

The inventive turbine blade is not only characterised by using carbon strip based first and second reinforcement structures, but also by integrating a specific stiffening element between the first and second reinforcement structures. Also, this stiffening element is integrated in the respective half shell between the upper and lower layer. At least one stiffening element is provided, which extends over at least a part of the length of the first and second reinforcement structures. This stiffening element comprises at least one stack composed of several glass fiber layers infused with resin, so also this stiffening element is embedded in the resin, in which also the carbon strip fiber based first and second reinforcement structures are embedded.

Thus, no carbon fiber protruded strips respectively pre-fabricated carbon strip stacks are used for building the stiffening element, which are expensive, and which are hard to be repaired respectively prevent the repair of adjacent areas like the adhesive area in case of need. Instead, at least one simple glass fiber layer composite stack is used, which can easily be built directly in the respective shell used for producing the half shell by simply arranging the respective glass fiber layers for building the at least one stack together with the other components needed for producing the half shell. As the half shell, which comprises several fiber layers to be infused with the resin for building the respective upper and lower shell layer, is finally infused with the resin, also the glass fiber layer stack is infused with the resin in this single infusion step. Thus, the stiffening element is simultaneously infused and therefore built when also the rest of the half shell is infused and built.

As this stiffening element, adjacent to which, seen in the peripheral direction of the blade, the first and second web is attached to the inner layer of the respective shell, is made of glass fiber layers embedded in the resin matrix, another advantage of this setup is the possibility to ease the joint repair where the web respectively the flange is attached to the inner layer, as it is possible to drill through these glass fiber reinforcement structures from the outside of the blade and inject adhesive through the glass laminate, an action which is not possible when carbon fiber protruded reinforcement structures are used like for the reinforcement structures, as they cannot be drilled.

So, the use of the inventive glass fiber based stiffening element shows several advantages. First, it is simple in design and its production is simple and can be realised together with the production of the respective shell. Second, the mass of expensive carbon fiber-based reinforcement measures is severely reduced, as only the first and second reinforcement structures comprise carbon fibers and can be placed exactly and only in areas of the shell where high loads appear and need to be handled. It is possible to locate the small carbon reinforcement structures in an optimal position within the profile of the respective shell in view of the loads respectively the load distribution, as they show enhanced mechanical properties, from which also the stiffening element, which is directly connected by the resin matrix, participates. They especially are capable for stiffening against an edgewise bending of the blade. They can be shaped exactly as needed and can therefore be quite slim in their cross section, as the stiffening element interposed between them also contributes to the overall stiffness of the blade. This stiffening element does not comprise any carbon fiber strips, allowing to reduce the amount of carbon-based material needed, which amount would be significantly higher when only the two reinforcement structures would be used for stiffening the blade. The stiffening element stiffens the blade mainly against a flap wise bending. And third, the possibility for repairing these areas especially in the joint region is given, as the glass fiber based stiffening element can be drilled.

Overall, embodiments of the invention propose a single reinforcement means comprising the first and second reinforcement structures being directly adjacent to the webs, and the stiffening means being arranged between both reinforcement structure, with the whole reinforcement means being infused or embedded in the resin respectively a resin matrix. Thus, this reinforcement means can be seen as a single spar cap which supports both webs.

The first and second reinforcement structures comprise glass and/or carbon fiber layers arranged between each pair of strips, which layers are infused with the resin. These intermediate glass or carbon fiber layers or fabrics allow the infusion with the resin between neighbouring pultrusion strips, which are firmly fixed to each other after curing the resin. Such a reinforcement structure can be produced as a pre-fabricated element and be inserted into the respective shell mould, in which the shell is produced and can be embedded in the resin matrix when the shell is infused with the resin. On the other hand, it is possible to also build these reinforcement structures, just like the stiffening element, directly in the respective shell mould simply by arranging the separate strips and the intermediate fiber layers or fiber fabrics in the shell mould and provide the resin infusion together with the overall shell infusion. This makes it possible to build the reinforcement structures directly in the shell mould and thus to build the whole reinforcement means comprising the reinforcement structures and the stiffening element together in one single resin infusion step together with the overall infusion of the relevant shell components.

In an embodiment, the glass and/or fiber layers sandwiched between two neighbouring carbon pultruded strips are biaxial layers. A biaxial fiber layer or fabric comprises fibers being arranged in an angle of 0° with other fibers being arranged at an angle of e.g., ±45°. Such a biaxial layer is advantageous, as it allows to take loads of different directions respectively of different types, e.g., loads from a flap wise or an edgewise bending of the blade.

In an embodiment of the invention, the first and second reinforcement structures and the stiffening element are mechanically connected via at least one glass or carbon fiber layer extending from the first reinforcement structure through the stiffening element to the second reinforcement structure. The reinforcement structures and the stiffening element are not only embedded in a common resin matrix but are also mechanically connected by at least one glass or carbon fiber layer, which extends through all these elements respectively parts of the reinforcement means. This common fiber layer serves for an even enhanced mechanical stability and stiffness of the reinforcement means arrangement and allows for an even better load support and load distribution.

In an embodiment, at least one of the glass fiber layers of the stiffening element extends into both stacks of the first and second reinforcement structures. So, the mechanical connection is provided by at least one glass fiber layer which is thus an integral part of the stiffening element stack. This glass fiber layer extends to both sides into the carbon strip stacks of the reinforcement structures, which respective stack then comprises this extended stiffening element layer as an integral layer of the stack. So, in this embodiment at least one glass fiber layer extends from one reinforcement structure through the stiffening element and into the other reinforcement structure.

In an alternative, also at least one carbon fiber layer sandwiched in a carbon strip-based stack of on reinforcement structure can extend through the stiffening element and into the other reinforcement structure. This embodiment is relevant when the carbon strip stacks comprise sandwiched, and resin infused carbon fiber layers. In this case the stiffening element is built nearly entirely from glass fiber layers with only one or a few sandwiched carbon fiber layers.

Even though an improved mechanical layout is realised throughout the reinforcement means when only one layer (either glass or carbon fiber layer) extends through both reinforcement structures and the stiffening element, it is desirable that all glass or carbon fiber layers of one reinforcement structure extend through the stiffening element and into the other reinforcement structure. So, there are several mechanical connection planes connecting the reinforcement structures with the stiffening element, which enhances the mechanical properties of this reinforcement means even more.

In a first inventive alternative only one stiffening element is provided, which extends over at least 70%, at least 80%, or especially over the entire length of the first and second reinforcement structures. Thus, both reinforcement structures are mechanically couple by only one stiffening element, which extends over most of the reinforcement structure length, or over their entire length, so that the whole reinforcement means, which can also be named as a hybrid reinforcement means or hybrid spar cap, extends in this specific setup over almost the entire blade length.

In another alternative it is possible that two or more stiffening elements are provided, each of which extends only over a part of the length of the first and second reinforcement structures. In this embodiment two or more separate and shorter stiffening elements are provided, which follow each other in the lengthwise direction but are distanced from each other, so that there is a gap between the stiffening elements, seen in the lengthwise blade direction. This gap may for example be filled with resin or with a light weight, but stiff core element for example made of wood or a polymer or the like, which core element is also embedded in the resin matrix of the whole reinforcement means. This embodiment allows for an even greater reduction of the used carbon material and therefore reduces the overall costs even more.

In a preferred embodiment the stacks of the stiffening element comprise biaxial and uniaxial glass fiber layers. As already mentioned, a biaxial fiber layer comprises fibers being arranged at an angle of 0° and other fibers being arranged at an angle of e.g., ±45°. Uniaxial fiber layers instead only comprise parallel fibers, which run in the lengthwise blade direction just like the 0° fibers of the biaxial layers. The biaxial layers allow to take loads of different directions respectively of different types, i.e., loads due to a flap wise and an edgewise bending of the blade, whereas the uniaxial fibers or layers especially enhance the stiffness against a flap wise bending. These different layer types may be arranged in an alternating manner with a uniaxial layer being followed by a biaxial layer being followed by a uniaxial layer etc. But it is also possible to stack for example two or three uniaxial layers followed by one or two biaxial layers again followed by three uniaxial layers etc. So specific designs regarding the arrangement of the different layer types are possible.

In a further embodiment one or more core elements are provided between the outer and/or the inner layer of the respective upper and lower half shell and the stiffening element. Such a core element allows to fill the space in the region of the stiffening element which in turn may have a smaller, compact design with sufficient mechanical properties, and which core element or elements allow for a further reduction of weight as they are lighter as the resin matrix with embedded glass fiber layers. Such a core element may have a mainly rectangular, wedge-like or trapezoid cross section. Especially the wedge-like or trapezoidal form provides that also the cross section of the stiffening element is not linear but somehow bended or angled.

Furthermore, core elements may be provided between the outer and the inner layer of the respective upper and lower half shell adjacent to the first and second reinforcement structures. These core elements, which are used for further adjusting the mechanical properties of the blade also in the areas next to the shell integrated reinforcement means, are also sandwiched between the outer and the inner layer of the respective upper and lower half shell.

Any of the above-mentioned core elements may be made of foam, wood, polymer or a composite material for example, while also this enumeration is not final.

Embodiments of the invention also refer to a wind turbine comprising several turbine blades as described, three turbine blades.

BRIEF DESCRIPTION

Some of the embodiments will be described in detail, with reference to the following figures, wherein like designations denote like members, wherein.

DETAILED DESCRIPTION

Figure 1:
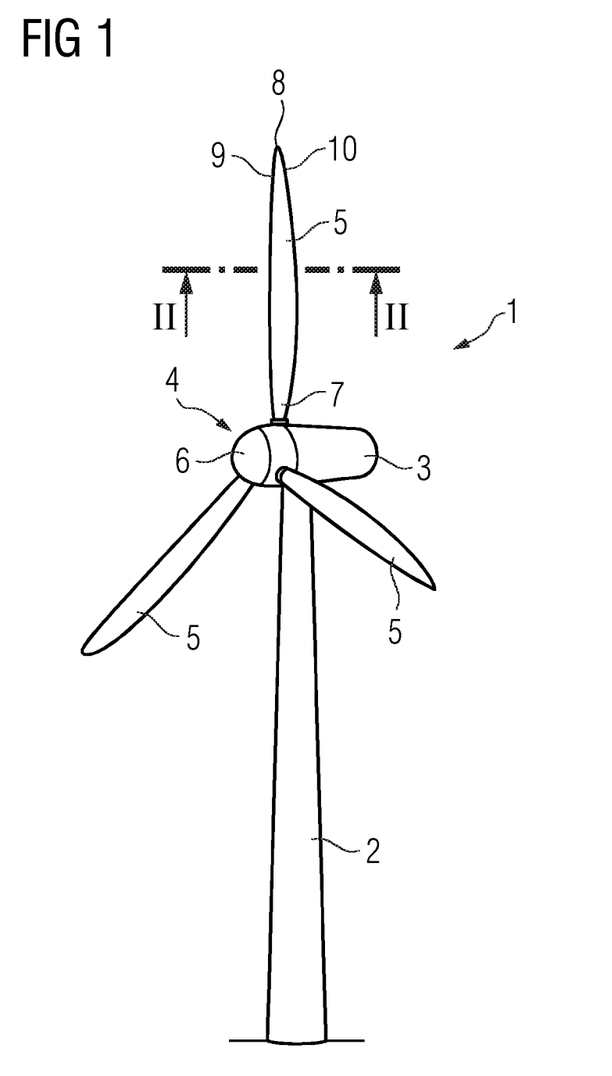
FIG. 1 shows a principle sketch of a wind turbine.

FIG. 1 shows a principle sketch of a wind turbine 1 comprising a tower 2, a nacelle 3 mounted on top of the tower 2 and a rotor 4 comprising three wind turbine blades 5 attached to a hub, which is operatively coupled to a generator arranged in the nacelle 3, which generator is driven by the rotational energy of the rotor 4 for producing electric power as commonly known.

Each turbine blade 5 comprises a root 7 for attaching the blade 5 to the hub 6 and a tip 8 at the other end. It furthermore comprises a leading edge 9 and a trailing edge 10.

Embodiments of the invention relate to the setup of the wind turbine blades 5.

Figure 2:
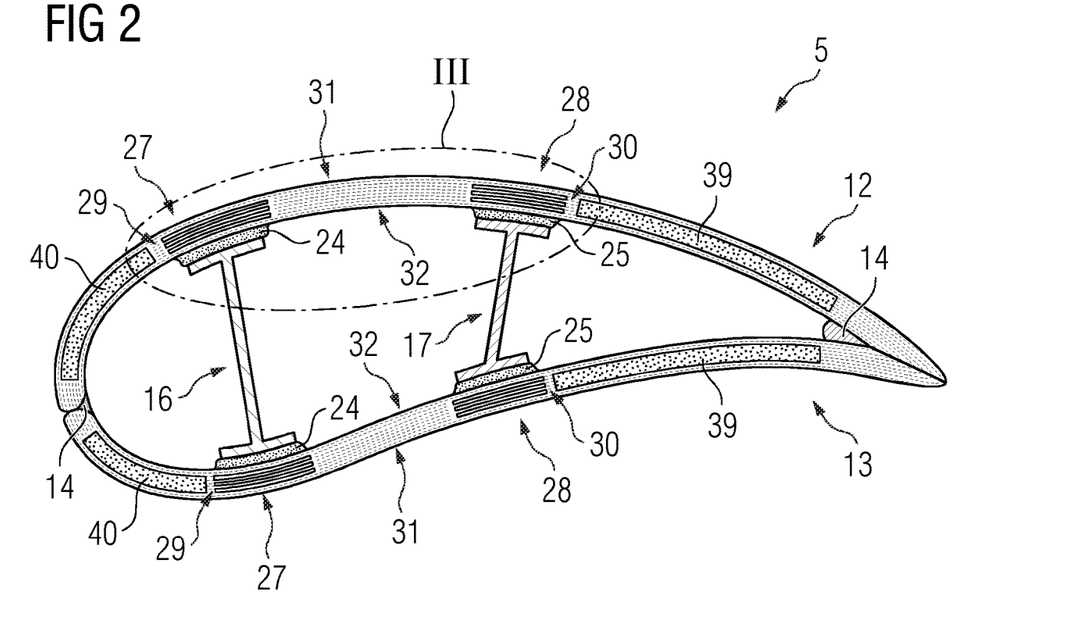
FIG. 2 shows a cross section through a blade of FIG. 1 of a first embodiment taken along the line II-II.

FIG. 2 shows a principle cross sectional view of the turbine blade 5 taken along the line II-II of FIG. 1. The blade 5 comprises a hollow body 11, which is made of an upper half shell 12 and a lower half shell 13, which are fixed to each other with an adhesive 14 and which encases a hollow space 15. In this space 15 a first web 16 and a second web 17 are arranged. Both webs 16, 17 are arranged in the area, where the upper half 12 and the lower half 13 have a great distance respectively where the blade has a great thickness. Both webs 16, 17 extend for example almost in parallel and almost over the whole length of the blade 5 starting adjacent to the root 7 and ending adjacent to the tip 8.

Both first and second webs 16, 17 are used for supporting the blade shells 12, 13 and for taking and distributing the respective loads resting on the blade 5, which loads result from aerodynamic reasons due to the rotation of the rotor 4 and the mechanical reasons due to the weight of the blade 5 itself.

The first web 16 comprises a web body 18 and two flanges 19 integrally attached to the web body 18 at its ends. The same H-shaped design is also realised at the second web 17, which comprises a web body 20 and two terminal flanges 21 integrally attached to the web body 20.

Figure 3:
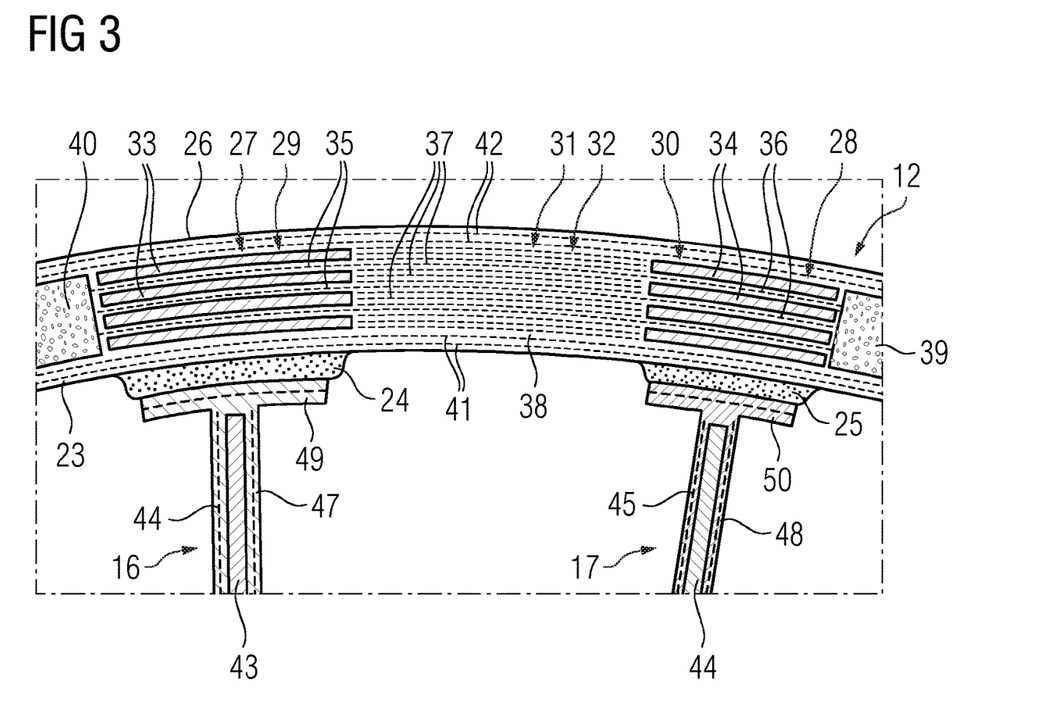
FIG. 3 shows an enlarged view of the section III of FIG. 2.

By these flanges 19, 21 both webs 16, 17 are attached to the inner side 22 of an inner layer 23 by means of an adhesive 24, 25, see also FIG. 3. The inner layer 23 is part of the respective half shell 12, 13, as shown in FIG. 3. FIG. 3 shows only a part, i.e., the section III of FIG. 2 of the upper half shell 12. It is to be noted that the same setup is also given at the lower half shell 13. While the inner layer 23 forms the inner part of the respective shell 12, 13, an outer layer 26 forms the outer part of the respective half shells 12, 13. The design will be further discussed in detail in regard to FIG. 3.

As both webs 16, 17 are attached to the inner layer 23 of the shells 12, 13 by the adhesives 24, 25, they need to be firmly supported by the respective shells 12, 13. To realise this support in each shell 12, 13 first reinforcement structures 27 for supporting the first web 16 and second reinforcement structures 28 for supporting the second web 17 are arranged respectively integrated and sandwiched between the inner and outer layers 23, 26. These reinforcement structures 27, 28 are made of respective stacks 29, 30 made of several pultruded composite strips comprising carbon fibers with the strips being fixed in the resin, which setup is discussed in more detail in regard of FIG. 3.

Between both reinforcement structures 29, 30, which are arranged in both shells 12, 13, a stiffening element 31 is arranged, which comprises a stack 32 of several glass fiber layers or fabrics, which are also embedded in a resin, and in the resin, in which also the carbon strip-based stacks 29, 30 are embedded. In total the combination of both reinforcement structures 27, 28 and the stiffening element 31 forms a single hybrid reinforcement means or hybrid spar cap, which is, due to the embedding of the respective stacks 29, 30 and the stack 32 comprising the carbon fiber pultruded strips in the resin, a very stiff element, which extends in a lengthwise direction of the blade and supports both webs 16, 17.

As can be seen from FIG. 2, the reinforcement structures 27, 28 are arranged in the blade areas, where higher loads arise. The blade shells are further stiffened by inserting the glass fiber based stiffening element 31 interposed between the reinforcement structures 27, 28, so that a very stiff blade area and design is realised, which is able to take and distribute also high loads arising during the operation of the wind turbine.

The carbon strip-based reinforcement structures 27, 28 mainly serve for supporting the webs 16, 17 and for stiffening the blade against especially an edgewise bending. The stiffening means interposed between the reinforcement structures 27, 28 provides the respective stiffening of the blade especially against a flap wise bending and also provides an enhanced stiffening of the reinforcement structures 27, 28, as they are firmly attached to the stiffening element 31 by the common resin matrix. So the inventive blade 5 comprises carbon fiber base reinforcement structures 27, 28 tailored to the need in view of the appearing loads and arranged in the optimal location in the profile regarding the appearance of the loads, while the stiffening element 31 serving for stiffening the intermediate area and for enhancing the mechanical properties of the overall hybrid reinforcement means respectively spar cap built from the two reinforcement structures and the interposed stiffening means, while it also omits carbon fiber pultruded strips as it is made of glass fiber layers. Therefor in the overall blade design the amount of carbon pultruded material is reduced to what is necessary for providing the requested mechanical properties.

FIG. 3 shows an enlarged principal view of the section III of FIG. 2 in cross section. It shows in part both webs 16, 17. Both webs, which have the same or a comparable setup, comprise a core 43, 44, for example made of balsa wood or foam or the like, which extends over almost the whole length of the respective web body 18, 20. It is encased in glass fiber layers 45, 46 infused with resin 47, 48. The respective flanges 19, 21 are integral with the respective web bodies 18, 20. Also the flanges comprise several glass fiber layers 49, 50, which are also infused or embedded in the resin 47, 48. Although only one respective glass fiber layer 45, 46 and 49, 50 is shown, several of these layers are provided for building a respective massive and mechanically stiff encasing. Especially the several layers 49, 50, which build the central part of the respective flanges 19, 21, comprise as well biaxial glass fiber layers as uniaxial glass fiber layers, which are all infused or embedded in the respective resin 47, 448. Also, the several layers 45, 46 at the respective infused web bodies 18, 20 may comprise uniaxial and biaxial glass fiber layers, which may be, just like in the flanges 19, 21, stacked in an arbitrary order.

As FIG. 3 also shows, the respective flanges 19, 21 are firmly fixed to the inner surface 22 of the inner layer 23 by means of the layers of adhesive 24, 25. This provides a very solid joint, which is necessary, as over this joint the respective loads are transferred.

The enlarged view of FIG. 3 also shows the two reinforcement structures 27, 28 and the stiffening element 31. It is obvious that both the reinforcement structures 27, 28 and the stiffening element 31 are sandwiched between the inner and outer layers 23, 26, which layers 23, 26 comprise several glass fiber layers 41, 42, which are infused or embedded in a resin 43, which is infused throughout the whole respective shell 12, 13, and which also embeds core elements 44 for example made of foam or balsa wood, which are arranged in the respective shell areas adjacent to the reinforcement structures 27, 28. No need to say that each layer 23, 26 may certainly comprise way more than only two glass fiber layers 41, 42 as shown in the principal sketch of FIG. 3.

As FIG. 3 shows, both reinforcement structures 27, 28 are arranged in direct extension of the respective webs 16, 17. Each structure 27, 28 comprises a stack 29, 30, with each stack 29, 30 comprising several pultruded composite strips 33, 34 comprising carbon fibers fixed in a strip resin. Between two adjacent strips 33, 34 one or more glass or carbon fiber layers 35, 36 are arranged. These glass or carbon fiber layers 35, 36 are biaxial layers and are used for infusing the respective stack 29, 30, so that by infusing the resin in this area the adjacent strips 33, 34 are firmly attached to each other.

Although only one respective glass or carbon fiber layer 35, 36 is shown between two adjacent strips 33, 34, several of these layers may be provided.

As already mentioned, a stiffening element 31 comprising a stack 32, which is composed of several glass fiber layers 37 is interposed between both reinforcement structures 27, 28. This stiffening element 31 respectively it's fiber layers 37 are distanced from the adjacent structures 27, 28 respectively the carbon-based stacks 29, 30 only by a small gap so that a compact overall design is given. Also, these layers 37 are embedded in a resin 38, which completely embeds all components of the respective shell 12, 13, here especially the respective reinforcement structures 27, 28 and the stiffening element 31.

As FIG. 3 clearly shows, the reinforcement structures 27, 28 and the stiffening element 31 are mechanically interconnected by several fiber layers, which extend from the reinforcement structure 27 through the stiffening element 31 to the reinforcement structure 28. In an embodiment, both reinforcement structures 27, 28 comprise glass fiber layers 35, 36, so that respective layers are common layers of all three elements, i.e., the reinforcement structures 27, 28 and the stiffening element 31. This means, that the extended glass fiber layers extending through all components comprise fiber layers 35, 36 and 37, but are one single layer extending through all three components. This means that the respective extended glass fiber layer forms part of the stacks 29, 30 and 31.

It is obvious that all components are infused in the same matrix resin 38. In the production of the respective half shell it is possible to insert all respective components in the respective shell mould by inserting the respective glass fiber layers 41 for building the respective inner layer 23, respective core elements 39 being arranged next to the reinforcement structures 27, 28, the separate strips 33, 34 with the interpost glass fiber layers 35, 36 and the respective shorter glass fiber layer 37 in the area where the stiffening element 31 shall be realised, followed by the glass fiber layers 42 for building the respective outer layer 26. After inserting all the components in the respective form mould the form is completely infused with resin for embedding all the inserted component.

As FIG. 3 shows, in this embodiment the stiffening element 31 is solely built from glass fiber layers 37, especially when also the common fiber layers extending through the stiffening element 31 and both reinforcement structures 27, 28 are glass fiber layers. If the stacks 29, 30 comprise carbon fiber layers, the stiffening element 31 may comprise some thin carbon fiber layers. However, the stiffening element 31 is built, it is possible to drill through this stiffening element 31, as it is solely or mainly composed from glass fiber layers. This allows for drilling holes through this area and to reach the respective adhesives 24, 25, by which the respective webs 16, 17 are attached to the inner layer 23 for repairing this joint if need be.

As mentioned, the stiffening 31 is composed of glass fiber layers 37. This glass fiber layer stack 32 comprises uniaxial and biaxial glass fiber layers, which provide enhanced mechanical properties in view of taking respective bending loads resulting from an edgewise and a flap wise bending.

Figure 4:
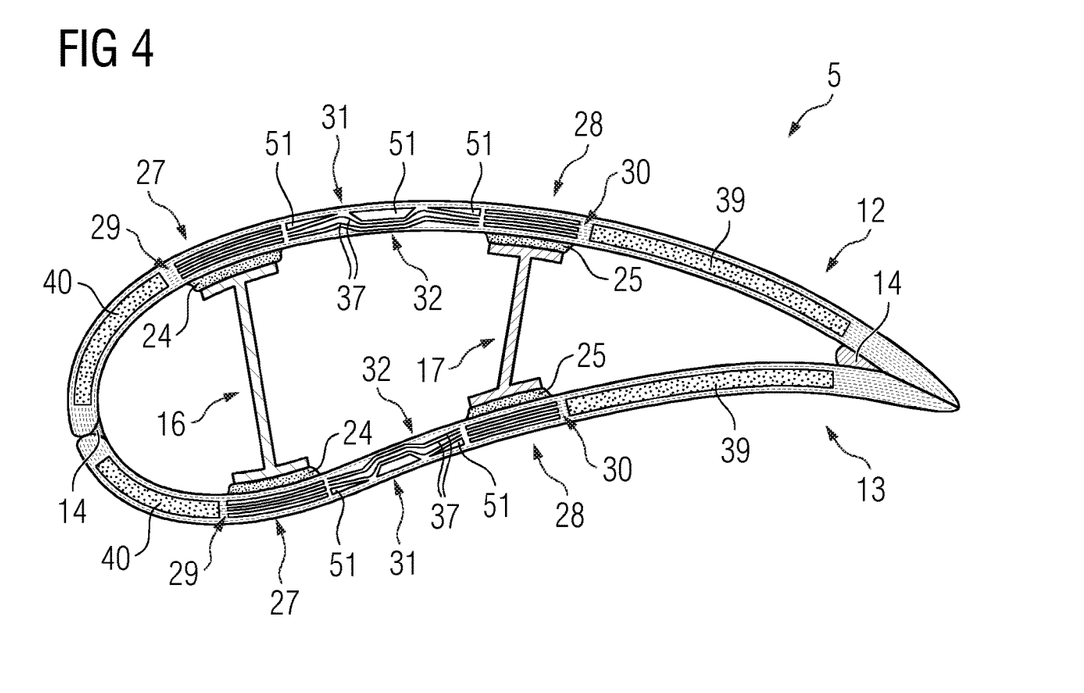
FIG. 4 shows a cross section through a blade of a second embodiment.

FIG. 4 shows another embodiment of a turbine blade 5, which has a comparable setup to the previous disclosed embodiment. It also comprises two half shells 12, 13, which are fixed to each other by an adhesive 14. In the hollow space two webs 16, 17 are attached to the inner surface of the respective half shells by means of an adhesive 24, 25 as previously described.

Furthermore, in each half shell 12, 13 two reinforcement structures 27, 28 comprising carbon pultruded stacks 29, 30 are embedded in the resin matrix, between which reinforcement structures 27, 28 a stiffening element 31 is arranged. Also, here the stiffening element 31 comprises glass fibers 37, which only extend between the strip stacks 29, 30, but some of which also extend in the respective strip stacks 29, 30 as disclosed to FIG. 3.

Different to the embodiment of FIG. 3, several core elements 51 are arranged in the area of the respective stiffening element 31. These core elements 51, which may be made from balsa wood or foamed material or the like, have a wedge-like shape or a trapezoidal shape, as shown in FIG. 4. The number of core elements 51 may differ in number and/or shape in the upper shell 12 and the lower shell 13, as disclosed in the example, but may also be the same.

These core elements fill the space between the inner and the outer layer 23, 26, so that the amount of glass fiber layers 37 needed for building the respective stiffening element 31 can be reduced, and also the amount of resin need for embedding the same. The geometry of the respective core elements 31 further provides for a certain geometry of the stiffening element 31 respectively the glass fiber layers 37, as they do not run in a straight line between the respective reinforcement structures 27, 28, but are somehow bent or angled.

The hybrid reinforcement means or hybrid spar cap comprising the stiffening element 31 and the reinforcement structures 27, 28 may comprise only one stiffening element 31 extending parallel to the reinforcement structures 27, 28 over almost the entire length of the blade 5. Aside providing only one stiffening element 31 it is possible to arrange two or more separate but shorter stiffening elements 31, which are arranged one after the other in lengthwise direction of the blade 5 with a certain gap between them. This gap may be filled with a core element, for example a foam element or the like, allowing a further reduction of the used carbon fiber mass while also providing enough stiffness, as the several stiffening elements 31 are still firmly embedded in the overall common matrix of the resin 38 and are also mechanically connected to the reinforcement structures 27, 28 by the extending glass fiber layers 35, 36 respectively 37.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine blade, with a hollow blade body comprising an upper and a lower half shell and first and second elongated webs each extending in the lengthwise direction of the blade and being disposed between and connected to the upper and the lower half shell, with each web comprising an upper and a lower flange connecting the respective web to the respective half shell, and with the first and second webs being supported via respective first and second reinforcement structures relative to the respective half shell, wherein the respective first and second reinforcement structures are arranged between an outer and an inner layer of the upper and lower half shell and extend in the lengthwise direction of the blade, wherein the first and second reinforcement structures each comprise at least one stack composed of several pultruded composite strips comprising carbon fibers with the strips being fixed in resin, wherein at least one stiffening element extending along the first and second reinforcement structures over at least a part of their length comprising at least one stack composed of several glass fiber layers infused with the resin is arranged between the first and second reinforcement structures and sandwiched between the outer and inner layer of each of the upper and lower half shell, wherein at least one of the glass fiber layers of the at least one stiffening element extends into both stacks of the first and second reinforcement structures and is arranged between respective pairs of the strips in the first and second reinforcement structure to form a common glass fiber layer of the first reinforcement structure, the at least one stiffening element, and the second reinforcement structure.

2. The wind turbine blade according to claim 1, wherein the first and second reinforcement structures further comprises carbon fiber layers arranged between the strips which are fixed in resin.

3. The wind turbine blade according to claim 2, wherein the glass and/or carbon fiber layers are biaxial layers.

4. The wind turbine blade according to claim 1, wherein the first and second reinforcement structures and the at least one stiffening element are mechanically connected by the at least one glass fiber layer that extends into both stacks.

5. The wind turbine blade according to claim 2, wherein at least one of the carbon fiber layers of one of the reinforcement structures extends through the at least one stiffening element and into the other reinforcement structure.

6. The wind turbine blade according to claim 5, wherein all glass or carbon fiber layers of one reinforcement structure extends through the at least one stiffening element and into the other reinforcement structure.

7. The wind turbine blade according to claim 1, wherein only one stiffening element is provided for at least one of the upper and lower half shell, which extends over at least 70%, at least 80% or over the entire length of the first and second reinforcement structures of the respective upper and lower half shell.

8. The wind turbine blade according to claim 1, wherein the at least one stiffening element comprises two or more stiffening elements, each of which extends only over a part of the length of the first and second reinforcement structures.

9. The wind turbine blade according to claim 1, wherein the stack of the at least one stiffening element comprises biaxial and uniaxial glass fiber layers.

10. The wind turbine blade according to claim 1, wherein one or more core elements are provided between the outer and/or the inner layer of the respective upper and lower half shell and the at least one stiffening element.

11. The wind turbine blade according to claim 10, wherein the one or each core element has a rectangular, wedge, or trapezoid cross section.

12. The wind turbine blade according to claim 1, wherein core elements are provided between the outer and the inner layer of the respective upper and lower half shell adjacent to the first and second reinforcement structures.

13. The wind turbine blade according to claim 10, wherein the core elements are made of foam, wood or polymer.

14. The wind turbine comprising several wind turbine blades according to claim 1.

* * * * *